(12) United States Patent
Maruyama

(10) Patent No.: US 10,771,760 B2
(45) Date of Patent: Sep. 8, 2020

(54) INFORMATION PROCESSING DEVICE, CONTROL METHOD OF INFORMATION PROCESSING DEVICE, AND STORAGE MEDIUM

(71) Applicant: CANON KABUSHIKI KAISHA, Tokyo (JP)

(72) Inventor: Kazuna Maruyama, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/113,967

(22) Filed: Aug. 27, 2018

(65) Prior Publication Data
US 2019/0068945 A1 Feb. 28, 2019

(30) Foreign Application Priority Data

Aug. 30, 2017 (JP) ................. 2017-166106

(51) Int. Cl.
H04N 5/232 (2006.01)
H04N 13/117 (2018.01)
G06T 15/20 (2011.01)
G06K 9/00 (2006.01)
A63F 13/5255 (2014.01)
H04N 13/194 (2018.01)
H04N 13/00 (2018.01)
H04N 13/243 (2018.01)

(52) U.S. Cl.
CPC ....... H04N 13/117 (2018.05); A63F 13/5255 (2014.09); G06K 9/00724 (2013.01); G06T 15/20 (2013.01); H04N 13/194 (2018.05); G06K 2009/00738 (2013.01); H04N 13/243 (2018.05); H04N 2013/0088 (2013.01)

(58) Field of Classification Search
CPC .. H04N 13/117; H04N 13/194; H04N 13/243; H04N 2013/0088; A63F 13/5255; G06K 9/00724; G06K 2009/00738; G06T 15/20
See application file for complete search history.

(56) References Cited

U.S. PATENT DOCUMENTS

2009/0128563 A1* 5/2009 Gloudemans ........... G06T 7/194
345/427
2014/0321767 A1 10/2014 Seto et al.
(Continued)

FOREIGN PATENT DOCUMENTS

CN 102819413 A 12/2012
CN 104707325 A 6/2015
(Continued)

Primary Examiner — Howard D Brown, Jr.
(74) Attorney, Agent, or Firm — Canon U.S.A., Inc. IP Division

(57) ABSTRACT

An information processing device decides a viewpoint position and generates a virtual viewpoint image based on the decided viewpoint position by using a plurality of images shot by a plurality of imaging apparatuses. The information processing device includes a determining unit configured to determine a scene related to the virtual viewpoint image to be generated, and a deciding unit configured to decide the viewpoint position related to the virtual viewpoint image in the scene determined by the determining unit, based on the scene determined by the determining unit.

19 Claims, 14 Drawing Sheets

(56) References Cited

U.S. PATENT DOCUMENTS

| | | | | |
|---|---|---|---|---|
| 2016/0105660 A1* | 4/2016 | Ito | ............... | H04N 13/204 |
| | | | | 348/46 |
| 2018/0048810 A1* | 2/2018 | Matsushita | ............ | H04N 5/247 |
| 2018/0089842 A1* | 3/2018 | Mizuno | ................... | G06T 11/00 |
| 2018/0288394 A1* | 10/2018 | Aizawa | ................ | H04N 5/2628 |
| 2019/0043245 A1* | 2/2019 | Ogata | ..................... | G06T 15/20 |
| 2019/0253639 A1* | 8/2019 | Takama | ............... | H04N 5/2224 |

FOREIGN PATENT DOCUMENTS

| | | |
|---|---|---|
| CN | 104871213 A | 8/2015 |
| CN | 107430789 A | 12/2017 |
| JP | 2008-015756 A | 1/2008 |
| WO | 2009/064893 A2 | 5/2009 |
| WO | 2009/064895 A1 | 5/2009 |

* cited by examiner

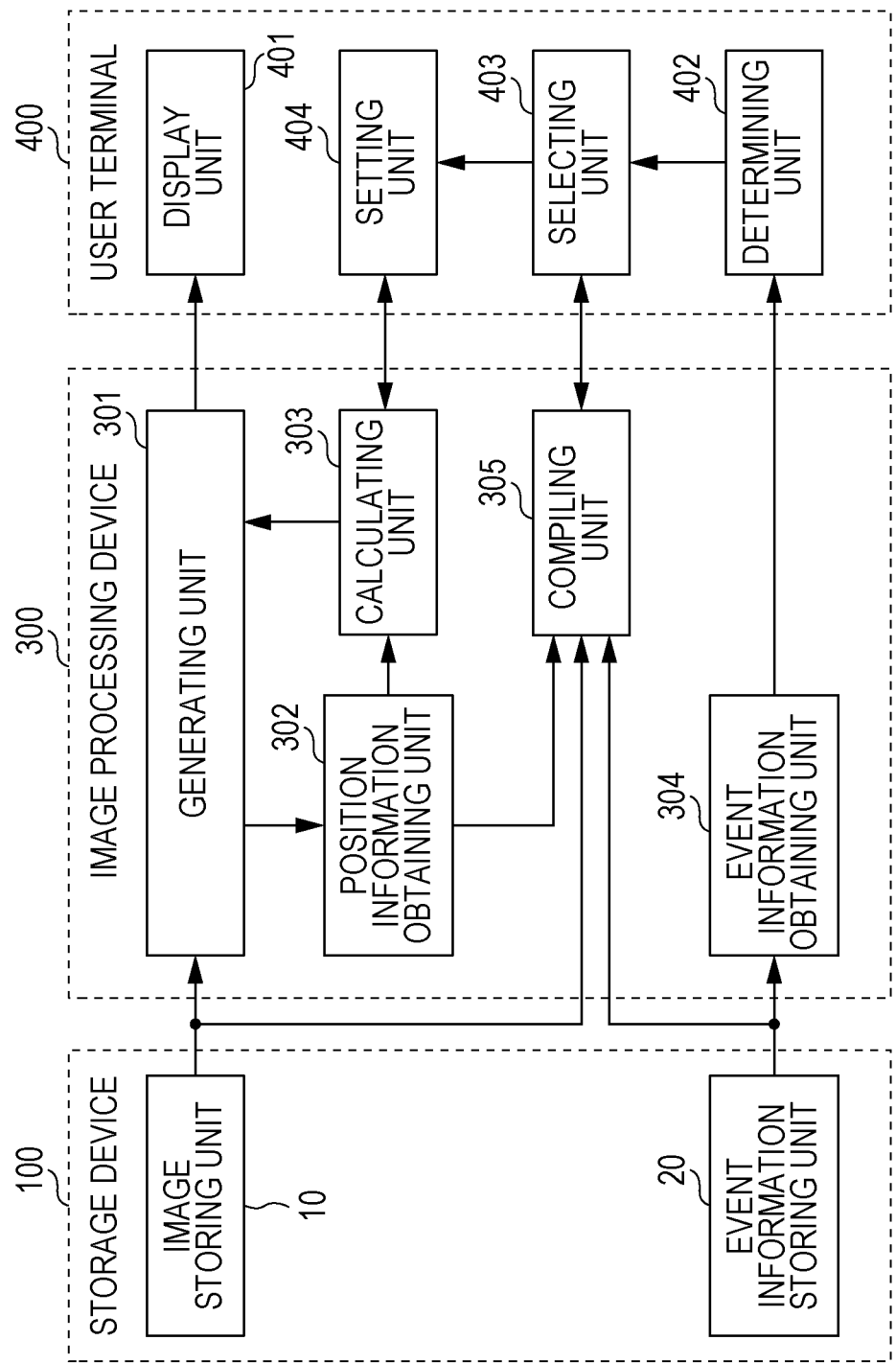

FIG. 2A

| TITLE | SOCCER A-CUP FINALS |
|---|---|
| DATE | 2017 / 06 / 02 |
| VENUE | B STADIUM |
| MATCH | TEAM C VS TEAM D |

FIG. 2B

| TEAM_HOME | TEAM C (CHECKED) |
|---|---|
| TEAM_AWAY | TEAM D (STRIPED) |
| PLAYER_HOME | AA (11), BB (15), CC (08), ... DD (32) |
| PLAYER_AWAY | EE (05), FF (02), GG (11), ... HH (01) |

FIG. 2C

| TIME 1 | TIME 2 | INCIDENT | SUPPLEMENTAL | SCORE | START OF SCENE | DURATION OF SCENE |
|---|---|---|---|---|---|---|
| 10:00:30 | 00 MINUTES INTO FIRST HALF | START OF FIRST HALF | | 0-0 | 10:00:25 | 00:00:10 |
| 10:03:50 | 03 MINUTES INTO FIRST HALF | SHOT | (NAME OF PLAYER) | 1-0 | 10:03:47 | 00:00:07 |
| 10:12:34 | 12 MINUTES INTO FIRST HALF | SHOT | (NAME OF PLAYER) | 2-0 | 10:12:23 | 00:00:15 |
| 10:25:55 | 25 MINUTES INTO FIRST HALF | CORNER KICK | | 2-0 | 10:25:53 | 00:00:10 |
| 10:39:02 | 38 MINUTES INTO FIRST HALF | FOUL | (NAME OF PLAYER) | 2-0 | 10:38:54 | 00:00:12 |
| 10:40:23 | 39 MINUTES INTO FIRST HALF | PENALTY KICK | (NAME OF PLAYER) | 2-1 | 10:40:20 | 00:00:08 |
| 10:48:20 | 47 MINUTES INTO FIRST HALF | END OF FIRST HALF | | 2-1 | 10:48:16 | 00:00:07 |

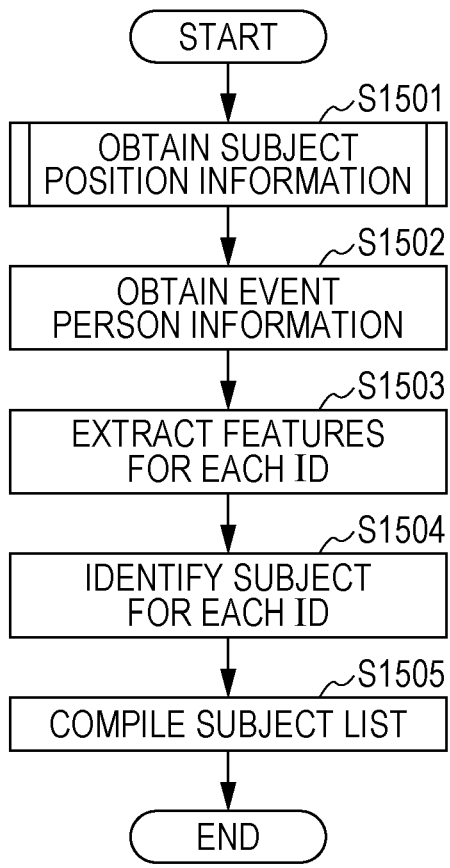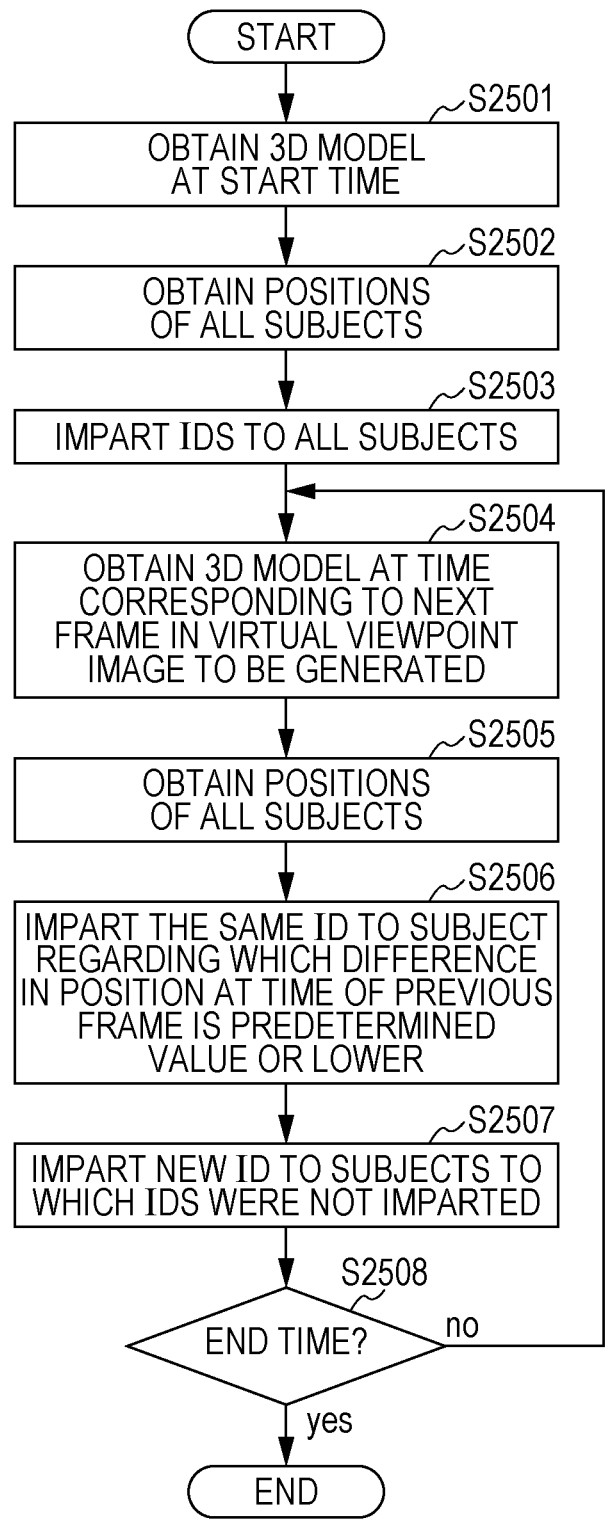

FIG. 6A
| ID01 | | (NAME OF PLAYER) |
|---|---|---|
| ID02 | | (NAME OF PLAYER) |
| ID03 | | BALL |
| ID04 | | (NAME OF PLAYER) |
| ID05 | | (NAME OF PLAYER) |
| ID06 | | (NAME OF PLAYER) |
| ID07 | | (NAME OF PLAYER) |
| ID08 | | (NAME OF PLAYER) |
FIG. 6B
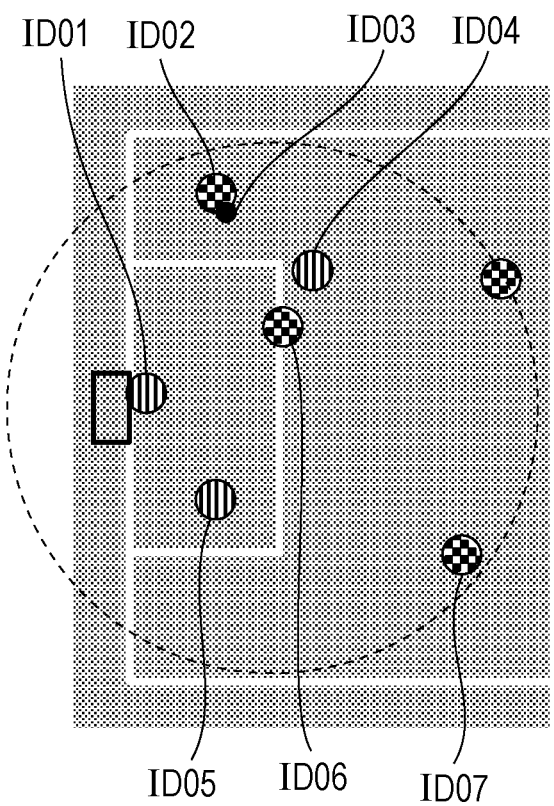
FIG. 6C
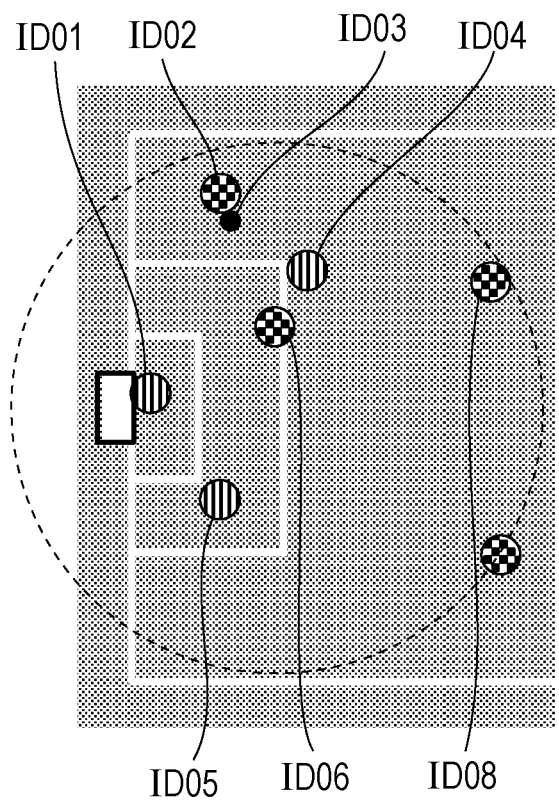

FIG. 8

| TYPE | | SPECIFIC EXAMPLES | |
|---|---|---|---|
| COMMON | | VIEW MOVEMENT OF ENTIRE SCENE FROM ABOVE | |
| BY SCENE TYPE | GOALS SCORED | FOLLOW BALL AT FRONT LINE OF * | * DEFENSE, OFFENSE |
| | | WATCH GOAL BEING SCORED AT POINT OF | * KICK, HEADING, GOAL |
| | FAILING TO SCORE | FOLLOW BALL AT FRONT LINE OF * | * DEFENSE, OFFENSE |
| | | WATCH SHOT MISSING GOAL FROM POINT OF * | * KICK, HEADING, GOAL |
| | OFFSIDES | WATCH OFFSIDE POSITION FROM * | * POSITION OF ASSISTANT REFEREE, OUTSIDE OF TOUCHLINE |
| | FOULS | CAREFULLY WATCH INSTANT OF FOUL | |
| PERSON-SPECIFIED | | WATCH FROM VIEWPOINT OF SELECTED PLAYER | |
| | | CONTINUE TO FOLLOW SELECTED PLAYER FROM * | * BEHIND, IN FRONT |

FIG. 9

| COMPOSITION SCENARIO | POSITION OF VIRTUAL CAMERA | | ORIENTATION OF VIRTUAL CAMERA / OBJECT OF INTEREST |
|---|---|---|---|
| VIEW MOVEMENT OF ENTIRE SCENE FROM ABOVE | 8 METERS ABOVE CIRCLE ENCOMPASSING PATH OF MOVEMENT OF BALL | | STRAIGHT DOWN |
| FOLLOW BALL AT FRONT LINE OF OFFENSE | 1 METER BEHIND OFFENSE PLAYER CLOSEST TO BALL | | DIRECTION OF TRAVEL OF BALL |
| WATCH GOAL BEING SCORED AT POINT OF GOAL | BEFORE SHOT | 3 METERS BEHIND GOAL POINT | BALL |
| | AFTER SHOT | 3 METERS BEHIND GOAL POINT | POINT OF SHOT |
| WATCH OFFSIDE POSITION FROM POSITION OF ASSISTANT REFEREE | POSITION OF ASSISTANT REFEREE AT TIME OF OFFSIDE OCCURRING | | PLAYER WHO IS OFFSIDE |
| CAREFULLY WATCH INSTANT OF FOUL | BEFORE FOUL | POSITION OF REFEREE | PLAYERS INVOLVED IN FOUL |
| | AT TIME OF FOUL | ONE CIRCLE AROUND POINT WHERE FOUL OCCURRED | POINT WHERE FOUL OCCURRED |
| | AFTER FOUL | POSITION OF REFEREE WHEN FOUL OCCURRED | POINT WHERE FOUL OCCURRED |
| WATCH FROM VIEWPOINT OF (NAME OF PLAYER) | POSITION OF (NAME OF PLAYER) | | DIRECTION IN WHICH HEAD OF (NAME OF PLAYER) IS FACING |
| CONTINUE TO FOLLOW SELECTED (NAME OF PLAYER) FROM BEHIND | 10 METERS BEHIND (NAME OF PLAYER) | | BACK OF (NAME OF PLAYER) |

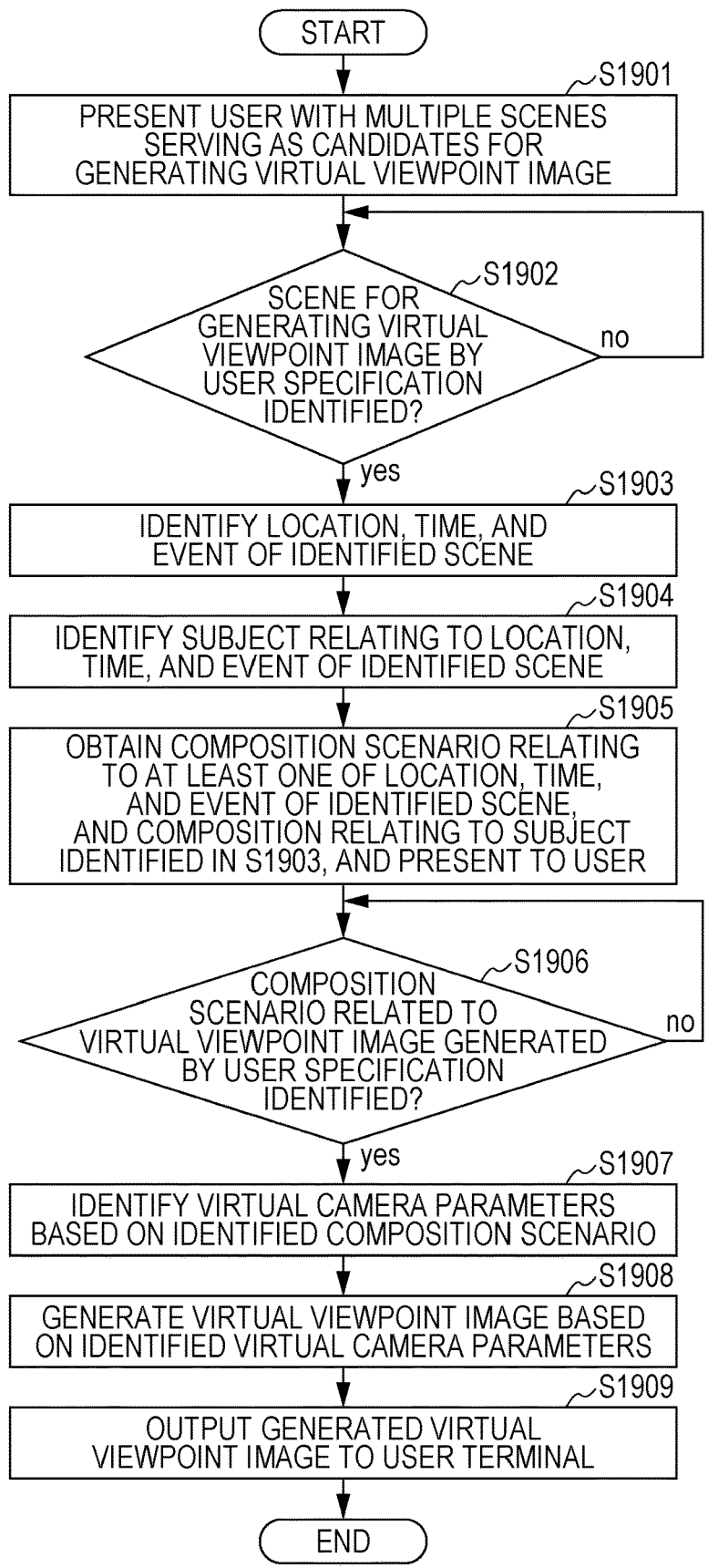

INFORMATION PROCESSING DEVICE, CONTROL METHOD OF INFORMATION PROCESSING DEVICE, AND STORAGE MEDIUM

BACKGROUND OF THE INVENTION

Field of the Invention

The present invention relates to technology for generating a virtual viewpoint image.

Description of the Related Art

There is a technology for installing multiple cameras at different positions and synchronously shooting from multiple viewpoints, and generating a virtual viewpoint image using the multiple viewpoint images obtained by the shooting. Japanese Patent Laid-Open No. 2008-015756 discloses a technology for generating a virtual viewpoint image from images taken by multiple imaging devices.

However, there has been the concern that setting viewpoints regarding virtual viewpoint images would be troublesome. For example, a case will be considered where a user views a virtual viewpoint image of a sport event at a stadium. In this case, generating virtual viewpoint images in accordance with viewpoints set by the user enables the user to watch the match from viewpoints preferred by the user. For example, scenes of scoring points in soccer or basketball preferably are viewed from a viewpoint where a player who has made the goal or basket is in the scene, while a long shot following the path of the ball might be desirable for viewing scenes other than scenes of scoring points. However, users not used to setting viewpoints for virtual viewpoint images might take time to set viewpoints appropriate for each scene, or might not be able to set viewpoints at desired positions. Note that the object of viewing regarding virtual viewpoint images is not restricted to sports, and the same problem can occur regarding concerts and other events as well.

SUMMARY OF THE INVENTION

An information processing device decides a viewpoint position and generates a virtual viewpoint image based on the decided viewpoint position by using a plurality of images shot by a plurality of imaging apparatuses. The information processing device includes a determining unit configured to determine a scene related to the virtual viewpoint image to be generated, and a deciding unit configured to decide the viewpoint position related to the virtual viewpoint image in the scene determined by the determining unit, based on the scene determined by the determining unit.

Further features of the present invention will become apparent from the following description of exemplary embodiments with reference to the attached drawings.

BRIEF DESCRIPTION OF THE DRAWINGS

FIG. 1 is a diagram illustrating the configuration of an image processing system.

FIGS. 2A through 2C are diagrams illustrating examples of event information.

FIGS. 5A and 5B are flowcharts illustrating the flow of subject list compilation processing.

FIGS. 6A through 6C are diagrams illustrating an example of up to a subject list being compiled.

FIG. 8 is a diagram illustrating an example of a composition scenario.

FIG. 9 is a diagram illustrating an example of virtual camera path conditions.

FIG. 14 is a flowchart illustrating the flow of processing by an image processing device.

DESCRIPTION OF THE EMBODIMENTS

An embodiment will be described with reference to the drawings. FIG. 1 is a diagram illustrating an example of an image processing system according to the present embodiment. The image processing system illustrated in FIG. 1 is an information processing system that generates virtual viewpoint images from multiple images obtained by shooting a shooting object such as a field where a sport event or the like is actually to be held, for example, from multiple cameras. A virtual viewpoint image is an image generated using images shot from multiple viewpoints, and is an image expressing virtual shooting results from an optional viewpoint or optional line-of-sight direction.

The image processing system includes a storage device 100, an image processing device 300, and a user terminal 400, as illustrated in FIG. 1. The storage device 100 stores, for example, multiple images obtained by shooting with multiple cameras installed in a stadium, or information necessary for automatically setting viewpoints regarding virtual viewpoint images. The image processing device 300 is an information processing device that decides positions of viewpoints relating to virtual viewpoint images, generates virtual viewpoint images, and so forth. The image processing device 300 generates virtual viewpoint images expressing virtual shooting results from the position of the decided viewpoint. The image processing device 300 also may generate virtual viewpoint images expressing shooting results in a case of directing a virtual camera in a line-of-sight direction that has been decided. The image processing device 300 generates virtual viewpoint images using multiple images, obtained by shooting with multiple cameras, that are stored in the storage device 100. The image processing device 300 transmits generated virtual viewpoint images to the user terminal 400.

The user terminal 400 displays virtual viewpoint images output from the image processing device 300 on a display screen that the user terminal 400 has. The user terminal 400 also accepts instruction for moving the position of the viewpoint relating to virtual viewpoint images, changing the line-of-sight direction relating to virtual viewpoint images, and switching viewpoints, based on user input, for example, and transmits transmission signals indicating the contents thereof to the image processing device 300 as virtual viewpoint information. The user terminal 400 also requests the image processing device 300 for automatic setting of virtual viewpoints based on later-described composition scenarios.

Figure 13:
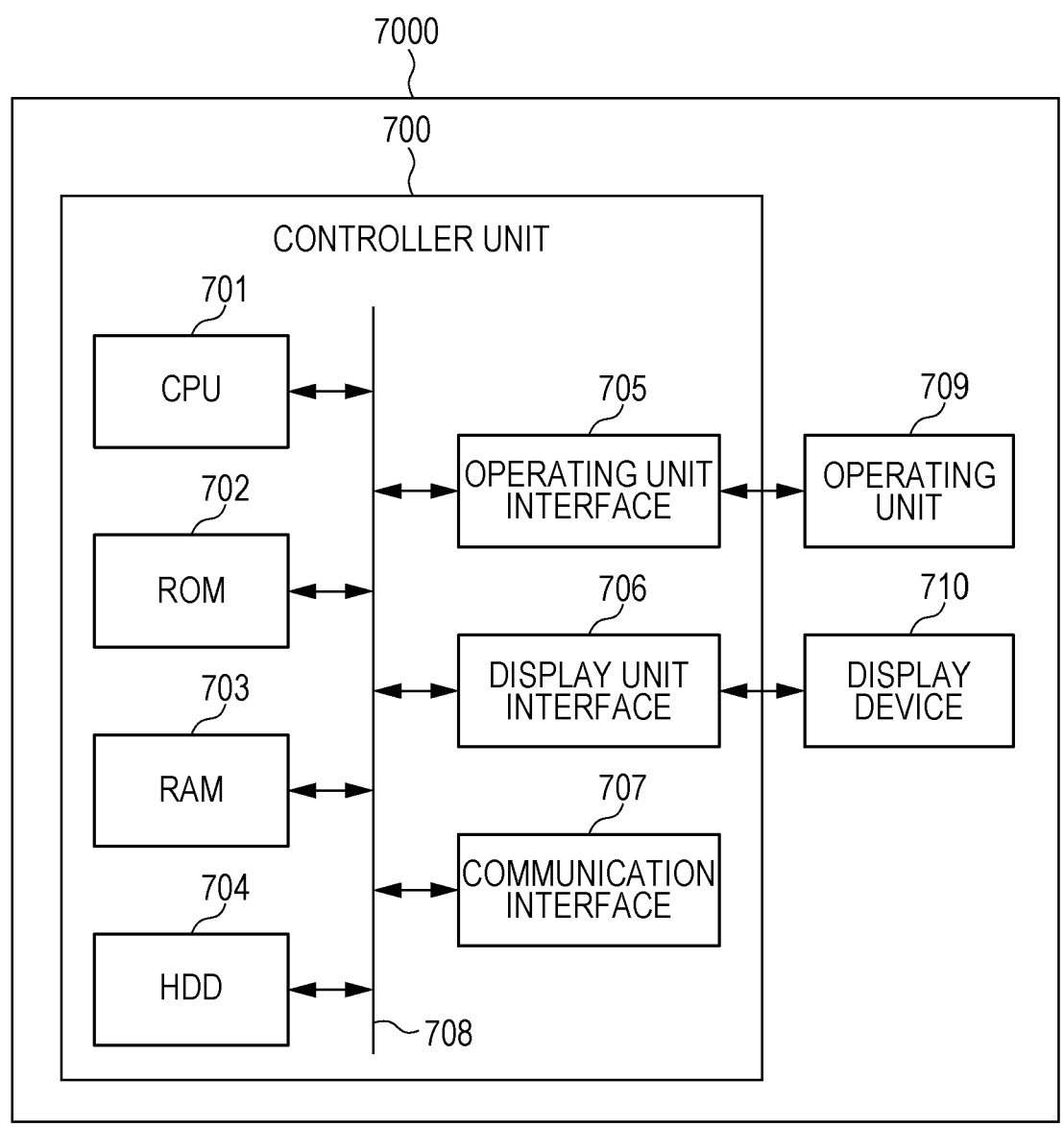
FIG. 13 is a diagram illustrating a hardware configuration of a device.

Next, an example of the configuration of the storage device 100, image processing device 300, and user terminal 400 will be described. FIG. 13 is a diagram illustrating an example of a hardware configuration of the storage device 100, image processing device 300, and user terminal 400. A device 7000 (storage device 100, image processing device 300, and user terminal 400) includes a controller unit 700, operating unit 709, and display device 710.

The controller unit 700 has a CPU 701. The CPU 701 activates an operating system (OS) by a boot program stored in read only memory (ROM) 702. The CPU 701 executes an application program stored in a hard disk drive (HDD) 704, on this OS. The CPU 701 realizes various types of processing by executing application programs. Random access memory (RAM) 703 is used as a work area for the CPU 701. The HDD 704 stores applications programs and so forth. Note that the CPU 701 may be a single processor or multiple processors.

The CPU 701 is connected to the ROM 702 and RAM 703, and an operating unit interface 705, a display unit interface 706, and a communication interface 707, via a system bus 708. The operating unit interface 705 is an interface to an operating unit 709. The operating unit interface 705 sends information input by the user from the operating unit 709 to the CPU 701. The operating unit 709 has a mouse and keyboard or the like, for example. The display unit interface 706 outputs image data to be displayed on a display device 710, to the display device 710. The display device 710 has a display such as a liquid crystal display or the like. The communication interface 707 is an interface for performing communication by Ethernet (registered trademark) or the like, for example, and is connected to a transmission cable. The communication interface 707 performs input/output of information with external devices via the transmission cable. Note that the communication interface 707 may be a circuit and antenna for performing wireless communication. The device 7000 may also perform display control, to display images on the display device 710. In this case, the device 7000 realizes display control by outputting display data to the display device 710. Note that not all of the elements illustrated in FIG. 13 are indispensable to the storage device 100, image processing device 300, or user terminal 400. For example, the display device 710 is not an indispensable element for the storage device 100 and image processing device 300. Although description has been made where the controller unit 700 has the CPU 701, this is not restrictive. For example, the controller unit 700 may have hardware such as an application-specific integrated circuit (ASIC) or a field-programmable gate array (FPGA) instated of the CPU 701 or along with the CPU 701. In this case, the hardware such as the ASIC or FPGA may perform part of all of the processing of the CPU 701.

Next, an example of the function configuration of the storage device 100, image processing device 300, and user terminal 400 will be described with reference to FIG. 1. The configurations illustrated in FIG. 1 are realized by the CPU 701 in FIG. 13 reading out various types of programs recorded in the ROM 702, and executing control of various parts. Note that part or all of the configurations illustrated in FIG. 1 may be realized by dedicated hardware. Examples of dedicated hardware include ASIC and FPGA.

An example of the functional configuration of the storage device 100 will be described. the storage device 100 includes an image storing unit 10 and an event information storing unit 20. The image storing unit 10 stores multiple images synchronously shot by multiple cameras installed surrounding the sports field or the like. The data that the image storing unit 10 stores may be data indicating still images, data indicating moving images, or data indicating both still images and moving images. Description will be made in the present embodiment with the understanding that that the term "image" includes still images and moving images, unless specifically stated otherwise.

The event information storing unit 20 stores event informs ion regarding images that the image storing unit 10 stores. Event information as used here includes basic information such as the title of an event that is the object of shooting, the day it was held, and the venue where it was held, person information such as performers, organizers, participants, and so forth in the event, and log information recording incidents occurring during the event in time-series. Note that event information is not restricted to these, and may include part of these or other information. FIGS. 2A through 2C illustrate examples of event information in a case where the event is a soccer match. Event basic information may include the title of the event, the date on which the event was held, the venue where the event was held, and team information regarding the names of the teams playing the match, as illustrated in FIG. 2A. Event person information may include the team names, uniform features such as color, pattern, and so forth, as illustrated in FIG. 2B. The event person information may include player information, such as the names of players, uniform numbers, and so forth, as illustrated in FIG. 2B. If the event to be shot is a sumo match, the event person information may include the names of the sumo wrestlers who will be facing off. If the event to be shot is a figure skating competition, the event person information may include the names of skaters performing.

Event log information includes the name of incidents and times of occurrence. In the example illustrated in FIG. 2C, event log information may include information indicating the time at which an incident occurred in terms of elapsed time from a reference time, such as the amount of time elapsed from the start of the match (start of the event), such as "3 minutes into the first half". In the example illustrated in FIG. 2C, event log information may also include supplemental information such as information for identifying the entity of the incident and individuals related to the incident, such as the name of players. Further, in the example illustrated in FIG. 2C, event log information may include information indicating the state at the time of the incident occurring, such as score information indicating the score at the time of the incident occurring. In the example illustrated in FIG. 2C, event log information may also include the time at which the incident started and scene duration time. Moreover, event log information may also include the start time and end time of the incident.

In a case where the event being shot is a ball sport such as a soccer match or the like, an incident indicated by the event log information might be a "shot (scored)", "shot (failed to score)", "pass", "corner kick", "foul", "violation (offside, etc.)" and so forth. Also, an incident indicated by the event log information might be a "goal", "penalty kick", "first half over", "halftime", "start of second half", and so forth. In a case where the event being shot is a concert, an incident indicated by the event log information may be the compositions to be performed. In a case where the event being shot is a sport event, an incident indicated by event log information might be the name of the sport. Note that the image processing device 300 or user terminal 400 may have part or all of the functional configuration of the storage device 100 described above.

Next, an example of the functional configuration of the image processing device 300 will be described. The image processing device 300 has a generating unit 301, a position information obtaining unit 302, a calculating unit 303, an event information obtaining unit 304, and a compiling unit 305.

The generating unit 301 generates a 3D model from multiple images obtained from the image storing unit 10, and generates a virtual viewpoint image by model-based rendering where texture mapping is performed according to a viewpoint relating to a virtual viewpoint image obtained from the calculating unit 303. Model-based rendering uses a 3D shape (mode) obtained by a 3D shape restoration technique such as silhouette volume intersection, multi-view stereo (MVS, or the like. Model-based rendering is a technique that generates an image taken by a virtual camera, from a viewpoint relating to the virtual viewpoint image, using the generated 3D shape. Other methods may be used for generating a virtual viewpoint image as well, such as image-based rendering or the like, for example. Image-based rendering is a rendering method where a virtual viewpoint image is generated from images shot from multiple viewpoints, without performing modeling (a process of creating shapes of objects using geometric shapes). The generating unit 301 outputs the generated virtual viewpoint image to the user terminal 400 via a network.

The position information obtaining unit 302 analyzes the images that have been shot, and obtains position information regarding a particular subject. For example, the position information obtaining unit 302 obtains position information of a particular subject based on a 3D model that the generating unit 301 has generated. The position information obtaining unit 302 also obtains information indicating the orientation of a particular subject, based on a 3D model that the generating unit 301 has generated. In the case of a sports event, the particular subject may be a person such as a particular player or referee or the like, or a ball.

The calculating unit 303 calculates the position and/or line-of-sight direction relating to the viewpoint relating to the virtual viewpoint image being generated. In the present embodiment, simulating a virtual camera to shoot the virtual viewpoint image being generated, and setting the position and/or line-of-sight direction of the viewpoint relating to the virtual viewpoint image being generated, will be referred to as "setting the position and orientation" of the virtual camera. A successive transition of position and orientation of the virtual camera is referred to as a "virtual camera path". That is to say, the image processing device 300 can generate multiple virtual viewpoint images based on the virtual camera path that has been set. The image processing device 300 can also generate multiple virtual viewpoint images generated based on the set virtual camera path as a single moving image.

In a case of having obtained virtual viewpoint information based on user operations from the user terminal 400, the calculating unit 303 decides the position and orientation corresponding to the virtual viewpoint information as being the viewpoint and line-of-sight direction relating to the virtual viewpoint image to be output. Virtual viewpoint information includes at least position information and direction information. In a case of having obtained information indicating a composition scenario, which is conditions for deciding a virtual camera path, from the user terminal 400, the calculating unit 303 calculates the virtual camera path based on the information indicated in the composition scenario. The calculating unit 303 uses subject position information obtained from the position information obtaining unit 302 to calculate a temporally successive virtual camera path, based on information indicating the composition scenario. Note that the calculating unit 303 sets the virtual camera path by setting virtual camera parameters. The virtual camera parameters include the position and/or orientation of the virtual camera. correlated with frame number or time code. The calculating unit 303 may also set the angle of view, focal length, zoom power, and so forth of the virtual camera, as virtual camera parameters.

The event information obtaining unit 304 obtains event information from the event information storing unit 20. The compiling unit 305 compiles a subject list from the event person information obtained from the event information storing unit 20 and the multiple images obtained from the image storing unit 10. The subject list here is a list indicating whether or not a virtual viewpoint image can be generated from viewpoints regarding each of subjects such as players, the ball, and so forth, in a scene of generating a virtual viewpoint image. The subject list will be described later in detail.

The compiling unit 305 also compiles a composition scenario from a scene regarding which the user has requested generation of a virtual viewpoint image obtained from the user terminal 400, an incident that has occurred in the scene, and a subject list. The composition scenario gives conditions and ideas for setting a virtual camera path. The composition scenario is represented as templates and rules relating to conditions on the position and orientation for the virtual camera. A composition scenario list is a list of composition scenarios that are selectable in a specified scene. The composition scenario list will be described later in detail. Note that the compiling unit 305 may have functions of generating a later-described scene selection screen. Also, the storage device 100 or user terminal 400 may have part of all of the functional configuration of the image processing device 300 described above.

Next, an example of the functional configuration of the user terminal 400 will be described. The user terminal 400 has a display unit 401, a determining unit 402, a selecting unit 403, and a setting unit 404.

The display unit 401 displays virtual viewpoint images obtained from the image processing device 300 via a network, and various types of information. The determining unit 402 performs determination to divide an event that has been shot into multiple scenes.

The determining unit 402 creates a scene selection screen showing multiple scenes as options, and displays the created scene selection screen on the display unit 401. The determining unit 402 divides the event that has been shot into multiple scenes based on event information. The determining unit 402 displays on the display unit 401 the scene selection screen for the user to select a scene for which to generate a virtual viewpoint image, in which the multiple scenes into which the event has been divided based on the event information are options. Note that the user terminal 400 may receive a scene selection screen from the image processing device 300 and display the received scene selection screen on the display unit 401. The determining unit 402 also determines a scene relating to generating a virtual viewpoint image that has been identified based on user operations. The determining unit 402 may also transmit information indicating the scene relating to generating a virtual viewpoint image that has been identified based on user operations to the image processing device 300 via a network. The determining unit 402 identifies at least one of the time relating to the scene that has been determined, the location, and an occurring incident. The determining unit 402 may also identify, based on the determined scene, at least one of the shooting time of the virtual viewpoint image to be generated, the location of the virtual viewpoint image to be generated, and the incident shown in the virtual viewpoint image to be generated.

The selecting unit 403 creates a composition scenario selection screen from the composition scenario list compiled by the compiling unit 305, and displays the compiled composition scenario selection screen on the display unit 401. Note that the user terminal 400 may receive the composition scenario selection screen from the image processing device 300 and display the received composition scenario selection screen on the display unit 401. The selecting unit 403 also selects the composition scenario relating to the generating of the virtual viewpoint image, that has been identified from the composition scenario list based on user operations. Also, in a case where a subject needs to be specified from the selected composition scenario, the selecting unit 403 creates a subject selection screen from the subject list obtained from the image processing device 300, and displays this on the display unit 401. Note that the user terminal 400 may receive a subject selection screen from the image processing device 300 and display the received subject selection screen on the display unit 401.

The setting unit 404 sets virtual camera path conditions based on the composition scenario and subject selected by the user, and transmits the set virtual camera path conditions to the image processing device 300 via a network. The virtual camera path conditions here are conditions for deciding virtual camera parameters, such as the position and orientation of the virtual camera, regarding the scene for generating the virtual viewpoint image. The virtual camera path conditions are conditions stipulating what the position and orientation of the virtual camera should be to shoot a certain subject at a time where a certain incident has occurred, for example. Note that the storage device 100 or image processing device 300 may have part of all of the functional configuration of the user terminal 400 described above. Although the image processing system is described as being made up of three devices, this may be one, two, or four or more devices.

Figure 3:
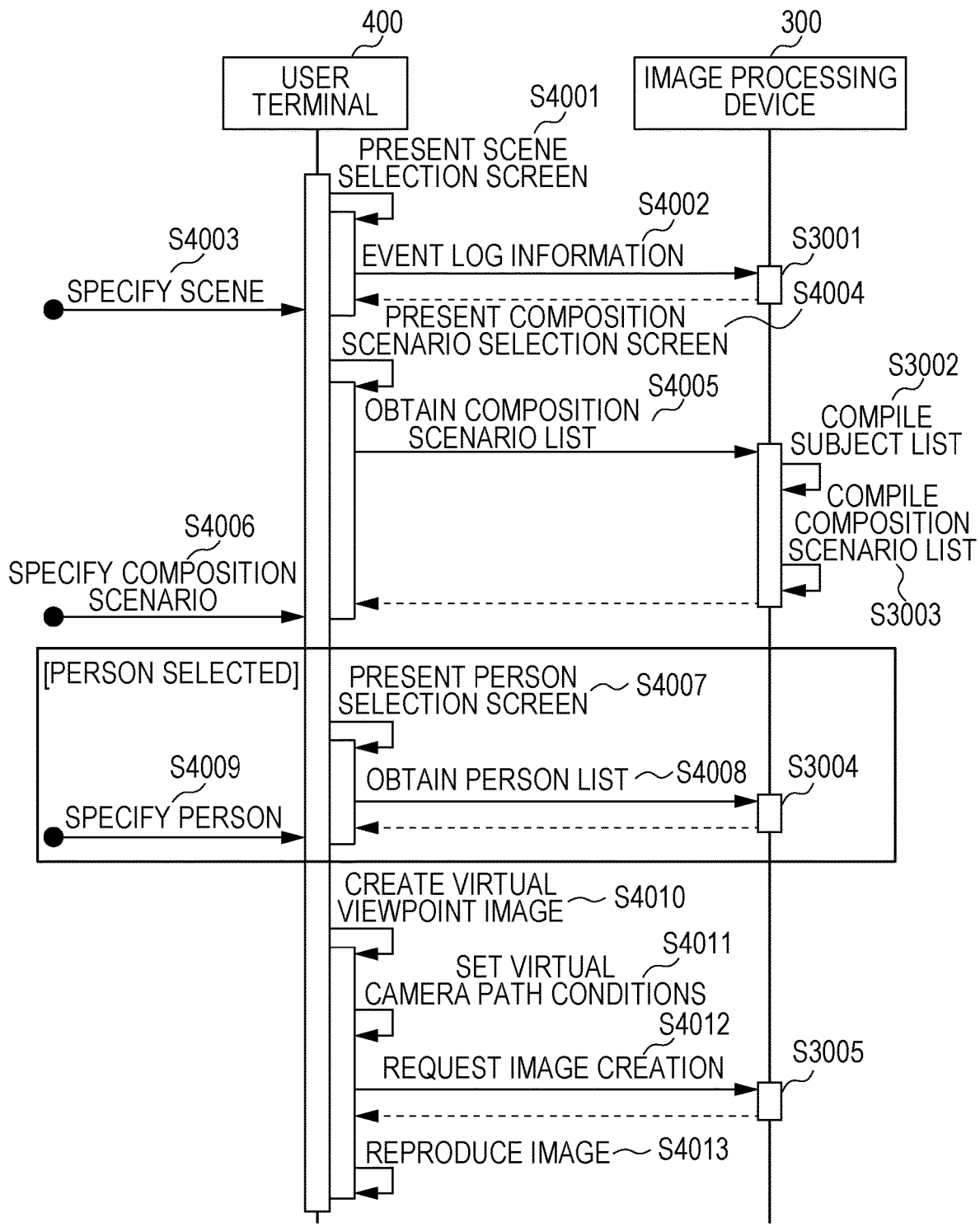
FIG. 3 is a sequence diagram of virtual viewpoint image generating processing.

The operations of the image processing system having the above-described configuration will be described. FIG. 3 is a sequence diagram of virtual viewpoint image generating processing by the image processing system. The image processing system starts the virtual viewpoint image generating processing by the user terminal 400 activating a virtual viewpoint image viewing application. The user terminal 400 activates the virtual viewpoint image viewing application, and starts scene selection screen presenting processing (S4001). The user terminal 400 requests the image processing device 300 for event information (S4002).

Upon receiving the request for event information from the user terminal 400, the image processing device 300 obtains event information that the event information storing unit 20 stores. The image processing device 300 transmits the obtained event information to the user terminal 400 (S3001). The user terminal 400 generates a scene selection screen based on the obtained event information, and displays the scene selection screen.

Figure 4C:
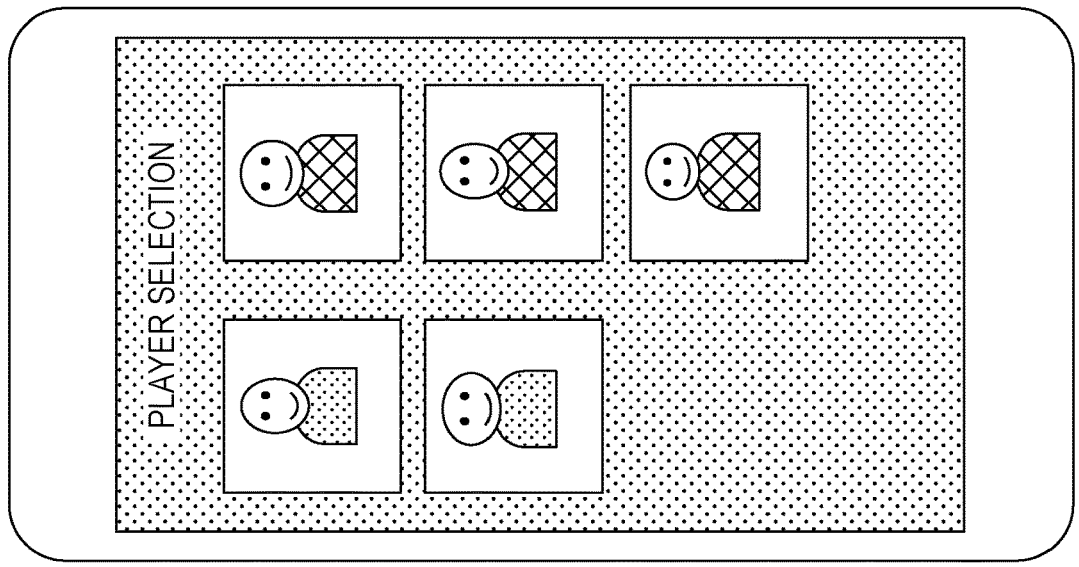
FIGS. 4A through 4C are diagrams illustrating screen examples of a user terminal.
Figure 4B:
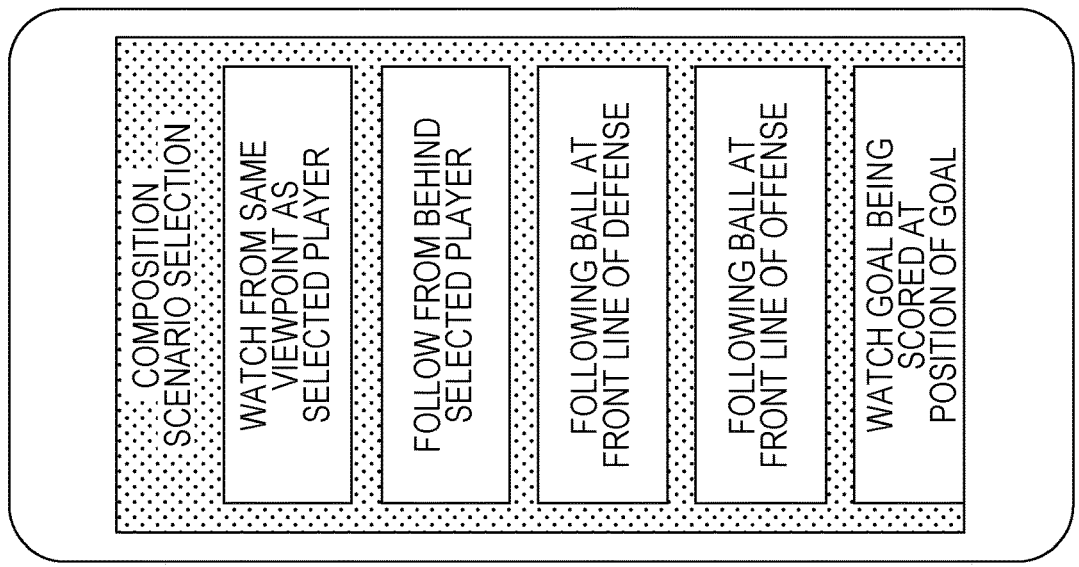
Figure 4A:
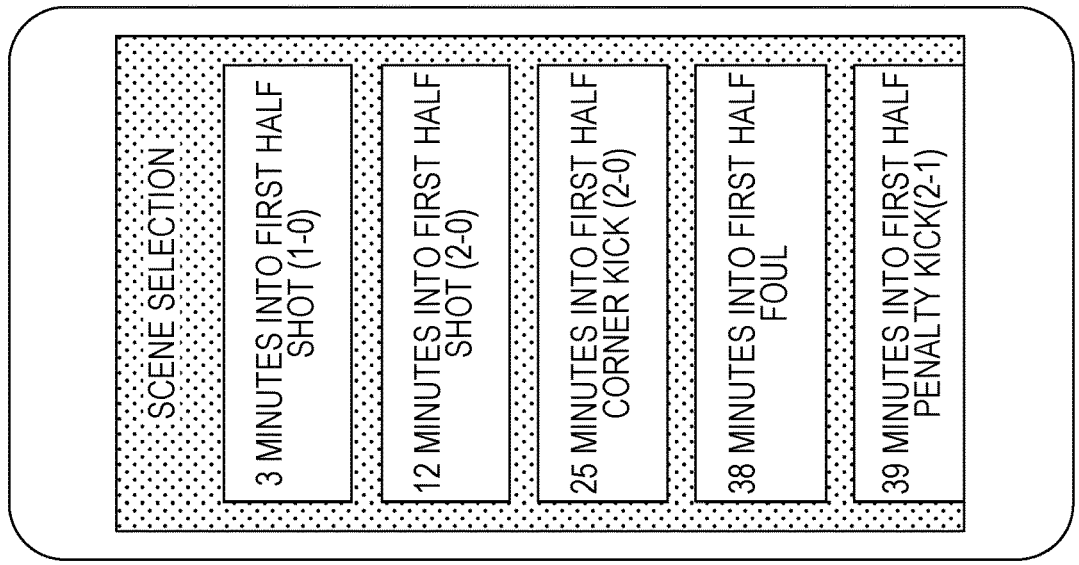

FIG. 4A illustrates an example of a scene selection screen displayed based on the event log information in a case where the event information that the user terminal 400 obtains is that illustrated in FIG. 2C. In the example illustrated in FIG. 4A, the scene selection screen presents, out of information included in event information, information indicating the time of occurrence of an incident, the name of the incident, and score information regarding incidents regarding which there is a possibility of change in score, in the scene selection screen. A scene selection screen may be used that presents part of this information. Also, the image processing device 300 may generate the scene selection screen illustrated in FIG. 4A, and the user terminal 400 may obtain the scene selection screen from the image processing device 300 and display it.

The user terminal 400 displays the scene selection screen, and accepts selection of a scene from the user (S4003). By accepting selection of a scene from the user, the user terminal 400 identifies the scene regarding the time, location, and situation for which the virtual viewpoint image is to be generated.

The user terminal 400 starts composition scenario selection screen presenting processing, to display a composition scenario selection screen (S4004). The user terminal 400 requests the image processing device 300 for a composition scenario list relating to this scene, along with the information for identifying the screen that the user has selected (S4005). The image processing device 300 compiles a subject list relating to the selected scene (S3002). The image processing device 300 compiles a composition scenario list relating to the selected scene using the compiling unit 305 (S3003).

Now, the subject list compiling processing in S3002 and the composition scenario list compiling processing in S3003 will be described in detail. FIG. 5A is a flowchart illustrating the flow of the subject list compiling processing by the compiling unit 305 of the image processing device 300. The flowchart in FIG. 5A starts with reception of a request to obtain a composition scenario list. Note that the processing of the flowchart described below is realized by the CPU 701 of the image processing device 300 computing information and controlling the hardware. Note that at least part of the steps in the flowchart may be realized by dedicated hardware. Examples of dedicated hardware include ASIC and FPGA.

The compiling unit 305 starts subject list compiling processing by receiving a request to obtain a composition scenario list from the user terminal 400. A subject list here is a list that indicates whether or not a virtual viewpoint image can be generated regarding the subjects such as players and the ball, for each frame from the start time to end corresponding to the specified scene. Depending on the state in which multiple cameras are installed, there can be cases where a virtual viewpoint image of a subject situated at a particular position cannot be generated. Accordingly, there can be periods of time where a virtual viewpoint image including a certain subject such as a player or the like cannot be generated, for example, depending on the position of the field that is the object of shooting.

The compiling unit 305 obtains subject position information relating to the specified scene from the position information obtaining unit 302 (S1501). The subject position information is information indicating the position of a particular subject. The subject position information may also be information relating to a subject that can be included in a virtual viewpoint image in the specified scene. The subject position information also may be information regarding a subject that can be included in the virtual viewpoint image from a viewpoint relating to a subject, such as the line-of-sight of the subject in the specified scene. Information regarding the position and orientation of each subject, and information for identifying each subject, may be included in the subject position information in correlation with time. The subject position information may also include the ID of each subject.

FIG. 5B is a flowchart illustrating the flow of subject position information obtaining processing by the position information obtaining unit 302. The position information obtaining unit 302 starts the subject position information obtaining processing by accepting a request to obtain subject position information from the compiling unit 305. The position information obtaining unit 302 obtains a 3D model at the start time of the specified scene from the generating unit 301 (S2501). Subsequently, the position information obtaining unit 302 obtains the position of all particular subjects included in the 3D mode at the start time of the scene (S2502). An arrangement may be made where the position information obtaining unit 302 obtains positions of particular subjects included a predetermined range according to the position where an incident occurs in the scene selected in S4003, to reduce the amount of processing.

The position information obtaining unit 302 imparts IDs to individually distinguish each subject situated in a range regarding which a virtual viewpoint image can be generated (S2503). In a case where the position of the subject at the time of starting of the scene is that illustrated in FIG. 6B, there are three players wearing checked uniforms, three players wearing striped uniforms, and one ball, in a circle indicated by a dotted line which is a region that a virtual viewpoint image can be generated, so ID01 through ID07 are imparted. Next, the position information obtaining unit 302 obtains a 3D model of time corresponding to the next frame in the virtual viewpoint image to be generated from the generating unit 301 (S2504). The position information obtaining unit 302 obtains the position of all subjects included in the 3D model for the time corresponding to the next frame that has been obtained (S2505).

The position information obtaining unit 302 identifies, for each of the subjects situated within the region regarding which a virtual viewpoint image can be generated for the time corresponding to the next frame, the subject that has the smallest positional difference regarding the time corresponding to the previous frame. The position information obtaining unit 302 then imparts the same ID as the previous frame to subjects of which the positional different is a predetermined value or smaller (S2506). In a case where there is a subject of which the positional difference as to time corresponding to the previous frame is not the predetermined value or smaller in the subjects situated within the region regarding which a virtual viewpoint image can be generated for the time corresponding to the next frame, the position information obtaining unit 302 imparts a new ID thereto (S2507). In a case where the subject positions at the time corresponding to the next frame are as illustrated in the example of FIG. 6C, there are three players wearing checked uniforms, three players wearing striped uniforms, and one ball, in the dotted circle which is a region that a virtual viewpoint image can be generated. The subjects are imparted the same IDs of ID01 through ID06, based on the positional difference in this frame as to the time corresponding to the previous frame. In the example illustrated in FIG. 6C, the player in the checked uniform at the lower right has moved outside of the circle in the start frame, so no ID is imparted thereto. The player in the checked uniform at the upper right has moved into the circle from outside of the circle in the start frame, so a new ID08 is imparted thereto. The position information obtaining unit 302 repeatedly performs the processing of S2504 through S2507 until the end time of the screen for generating the virtual viewpoint image. In a case of having ended processing up to the portion corresponding to the end time of the scene (Yes in S2508), the position information obtaining unit 302 ends the subject position information obtaining processing.

Returning to the description in FIG. 5A, the compiling unit 305 obtains event person information from the event information storing unit 20 (S1502). The compiling unit 305 analyzes multi-viewpoint video obtained from the image storing unit 10, and extracts features such as the color, pattern, and uniform number of uniforms, for each of the subjects distinguished by IDs (S1503). Next, the compiling unit 305 matches the features such as color, pattern, and uniform number of uniforms included in the event person information, with the extracted features, and identifies who the individual subjects distinguished by IDs are (S1504). Subjects that are not people, such as the ball or the like, can be identified by storing features such as shape and size in the compiling unit 305. The timing at which S1502 is processed may be any timing as long as it is before S1504, and accordingly maybe before S1501 or after S1503.

Next, the compiling unit 305 compiles a subject list (S1505). FIG. 6A illustrates an example of a subject list. It can be seen from the example illustrated in FIG. 6A that five players and one ball have been situated in a region regarding which a virtual viewpoint image can be generated for all frames from the start to the end of the scene, and two players were situated outside the region regarding which a virtual viewpoint image can be generated at part of the frames.

Figure 7:
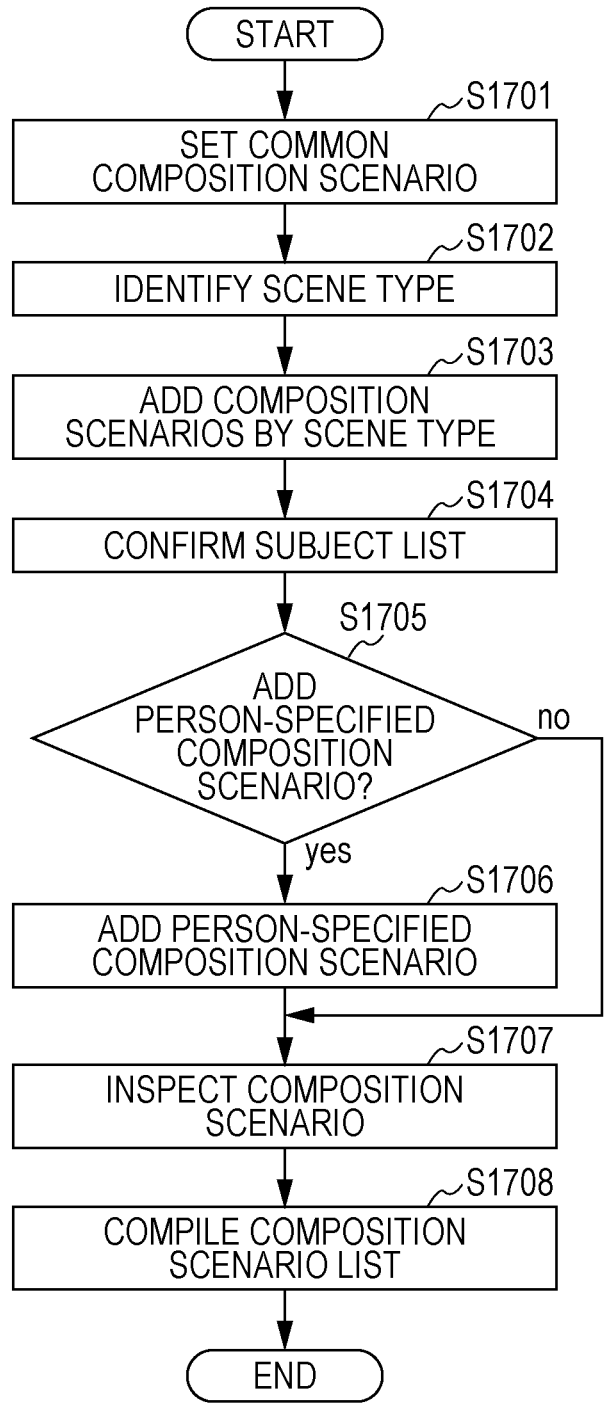
FIG. 7 is a flowchart illustrating the flow of composition scenario list compilation processing.

Next, the composition scenario list compiling processing of S3003 will be described in detail. FIG. 7 is a flowchart illustrating the flow of the composition scenario list compiling processing by the compiling unit 305. Upon the subject list compiling processing ending, the compiling unit 305 starts the composition scenario list compiling processing. The compiling unit 305 sets a common composition scenario that is not dependent on the scene content (S1701). An example of a common composition scenario that is not dependent on the scene content is, in a case that the event is a soccer match, "view movement of entire scene from above" as in FIG. 8. In this composition scenario, a plane view virtual viewpoint image where the virtual camera is situated overhead is generated, regardless whether the selected scene is a shot scene, foul scene, or any other such scene. Another example of a common composition scenario that is not dependent on the scene content is "view from sideline with ball in center of view". Yet another example of a common composition scenario that is not dependent on the scene content is "view toward the goal with the position of the ball as the viewpoint".

Next, the compiling unit 305 identifies the type of selected scene (S1702). In a case where the event is a soccer match, the compiling unit 305 may classify the scene for generating a virtual viewpoint image into one of scoring, failing to score, offside, and fouling, for example. In this case, the compiling unit 305 classifies the types of scenes such as shots, corner kicks, penalty kicks, and other such scenes, into whether scored or failed to score. Scene types of offside and fouling are offside and fouling, respectively.

The compiling unit 305 adds a composition scenario that is dependent on the identified scene type (S1703). FIG. 8 illustrates examples of composition scenarios where the scene type is scoring, in a case where the event is a soccer match. Examples of composition scenarios in FIG. 8 include "follow ball at front line of * (where * is offense, defense, etc.)" and "watch goal being scored at point of * (where * is kick, heading, goal, etc.)". In a composition scenario of "follow ball at front line of offense", a virtual viewpoint image is generated where the virtual camera successively follows offense players in contact with the ball. This sort of composition scenario is an example of a composition scenario where the position and orientation of the virtual camera is decided from the positional relation of the ball and multiple offense-side players in each frame from the start to the end of the scene.

The "watch goal being scored at point of goal" scenario generates a virtual viewpoint image where the virtual camera is placed behind the goal on a straight line from the point where the ball was kicked to the point at which the goal line was crossed, thus capturing the way in which the ball flies into the goal. Such a composition scenario is an example of composition scenarios where the position and orientation of the virtual camera is decided from the positional relation of the ball and players, at a particular time such as a kick scene or goal scene.

Also, the "carefully watch instant of foul" composition scenario in FIG. 8 generates a virtual viewpoint image where the virtual camera is rotated around the position at which the foul occurred, while stopping time at the frame in which the foul occurred, so as to observe the instant of the foul from 360 degrees. This composition scenario is an example of a composition scenario where the virtual camera is moved in a state with time stopped, based on the position of a player in a particular frame. That is to say, in this case, multiple virtual viewpoint images are generated of the subject at a particular point in time, from various viewpoints.

Note that the above-described composition scenarios are examples and that other composition scenarios may be used. Further, composition scenarios relating to the scene may be used, without classifying scenes into types. For example, in a case where the incident occurring in the scene regarding which a virtual viewpoint image is to be generated is "shot (scored)" or "shot (failed to score)", then "watch from line-of-sight of goalie" or "watch from line-of-sight of striker" may be used as composition scenarios. Also, in a case where the incident occurring in a scene regarding which the virtual viewpoint image is to be a generated is a "pass", "watch from line-of-sight of player receiving pass" or "watch from line-of-sight of player delivering pass" may be used as composition scenarios. Alternatively, composition scenarios relating to scenes may be decided by user input.

Next, the compiling unit 305 confirms the subject list (S1705), and determines whether or not to add a person-specified scenario. The compiling unit 305 determines in S1704 whether or not there is a person situated in a region regarding which a virtual viewpoint image can be generated for all frames from the start of the scene to the end, for example. In a case where there is a person situated in a region regarding which a virtual viewpoint image can be generated for all frames, the compiling unit 305 determines to add a person-specified scenario, and in a case where there is no person situated in a region regarding which a virtual viewpoint image can be generated for all frames, the compiling unit 305 does not determine to add a person-specified scenario. Also, for example, the compiling unit 305 determines in S1704 whether or not there is a person in the subject list from the start to end of the scene. In a case where there is a person in the subject list from the start to end of the scene, the compiling unit 305 determines to add a person-specified scenario, and in a case where there is no person in the subject list from the start to end of the scene, the compiling unit 305 does not determine to add a person-specified scenario. Although description is made here to determine to add a person-specified scenario in a case where there is a person situated in a region regarding which a virtual viewpoint image can be generated for all frames from start to end, this is not restrictive. For example, an arrangement may be made to add a person-specified scenario in a case where there is a person situated in a region regarding which a virtual viewpoint image can be generated for a predetermined number of frames or more. Also, for example, an arrangement may be made to determine to add a person-specified scenario in a case where there is a person facing the point of occurrence of the incident occurring in the scene. Also, an arrangement may be made to determine to add a person-specified scenario in a case where there is a person by whose tine-of-sight a virtual viewpoint image can be generated in the scene. Further, an arrangement may be made where the processing of S1705 is omitted, and a person-specified scenario is always added.

Next, in a case of determining to add a person-specified scenario (Yes in S1705), the compiling unit 305 adds a person-specified composition scenario (S1706). Examples of a person-specified scenario include, in a case where the event is a soccer match, "view from viewpoint of selected player" or "continue to follow selected player from * (where * is behind, in front, etc.)". In the "view from viewpoint of selected player" composition scenario, a virtual viewpoint image is generated that reproduces the field of view of the particular player, by matching the position and orientation of the virtual camera with the position and orientation of the face of the particular player. Such a composition scenario is an example of a composition scenario where the position and orientation of the virtual camera are decided from the position and orientation of one particular player over all the frames. A configuration may also be made where a configuration scenario is added that is person-specific regarding the person related to the scene regarding which the virtual viewpoint image is to be generated. For example, a person-specified scenario may be added regarding a player who has come into contact with the ball, in the scene regarding which the virtual viewpoint image is to be generated.

Next, the compiling unit 305 inspects whether or not a virtual viewpoint image can be generated for the selected scene regarding the added composition scenarios (S1707). In a case where the event is a soccer match, a scoring compositional scenario "watch goal being scored at point of heading", for example, is not satisfied if the shot was kicked, so judgement is made that a virtual viewpoint image cannot be generated. The compiling unit 305 excludes composition scenarios regarding which judgment has been made that a virtual viewpoint image cannot be generated. The compiling unit 305 compiles a composition scenario list of composition scenarios regarding which judgment has been made that a virtual viewpoint image can be generated (S1708). The composition scenario list that the compiling unit 305 has created is transmitted to the user terminal 400 and presented to the user as a composition scenario selection screen.

FIG. 4B illustrates an example of a composition scenario selection screen in a case where the selected screen is a point scoring scene such as "3 minutes into first half, shot, (1-0)" in the example illustrated in FIG. 2C or the like, and a person-specified scenario is added. Multiple composition scenarios that are conditions for setting the virtual camera path are presented to the user in a selectable manner in FIG. 4B.

Returning to the description of FIG. 3, the user terminal 400 displays a composition scenario selection screen such as illustrated in FIG. 4B for example, based on the composition scenario list. The user terminal 400 selects a composition scenario identified from the composition scenario selection screen, based on user specification (S4006). In a case where the selected composition scenario relates to a person, the user terminal 400 presents a subject selection screen (S4007). The user terminal 400 displays a subject selection screen such as illustrated in FIG. 4C, for example, based on the subject list. FIG. 4C is an example of a subject selection screen in a case where the viewer has selected "view from viewpoint of selected player" in the composition scenario selection screen illustrated in FIG. 4B. The user is presented with multiple people in FIG. 4C, for selection of a person as a condition for setting the virtual camera path. The subject selection screen may also include additional information such as name of person, uniform number, team, facial photograph, and so forth.

The user terminal 400 selects a particular person from the subject selection screen (S4009). Next, the user terminal 400 starts virtual viewpoint image creation processing (S4010). The setting unit 404 of the user terminal 400 sets virtual camera path conditions based on the selected scene received from the selecting unit 403, and the composition scenario and person (S4011). Virtual camera path conditions are conditions stipulating the relation between the position and orientation of the virtual camera, and positional information of the subject, in order to realize the composition scenario.

FIG. 9 is an example of settings for virtual camera path conditions by the setting unit 404, in a case where the composition scenario list is the example illustrated in FIG. 8. For example, in a case where the event is a soccer match, the position of the virtual camera in the composition scenario "view movement of entire scene from above" is "8 meters above center of circle encompassing path of movement of ball", and the orientation of the virtual camera is "straight down". Note that these specific numbers are only exemplary, and that the position of the virtual camera in the composition scenario "view movement of entire scene from above" may be another position.

Figure 10A:
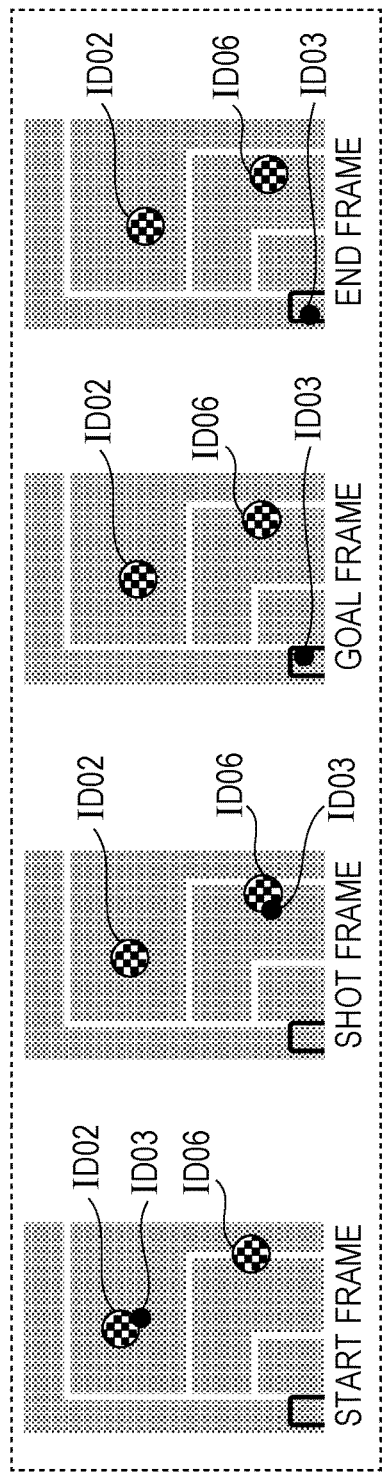
FIGS. 10A through 10C are diagrams illustrating a specific example of virtual camera path conditions.

Now, a specific example of virtual camera path conditions will be described with reference to FIGS. 10A through 10C. In the scene regarding which a virtual viewpoint image is to be generated, a player of ID02 kicks the ball with ID03 at a time corresponding to the start frame of the virtual viewpoint image to be generated, and delivers a pass to a player with ID06, as illustrated in FIG. 10A. The player of ID06 who has received the pass kicks a goal shot. The frame of the virtual viewpoint image corresponding to the time at which the player of ID06 has kicked the shot is thus a shot frame.

The ball shot by the player of ID06 crosses the goal line. The frame in the virtual viewpoint image corresponding to the time of crossing the goal line is the goal frame. The frame of the virtual viewpoint image corresponding to the time of ending the virtual viewpoint image to be generated is the end frame.

Figure 10B:
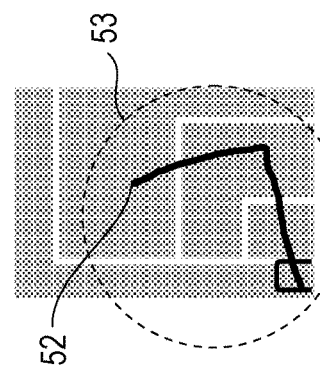
Figure 10C:
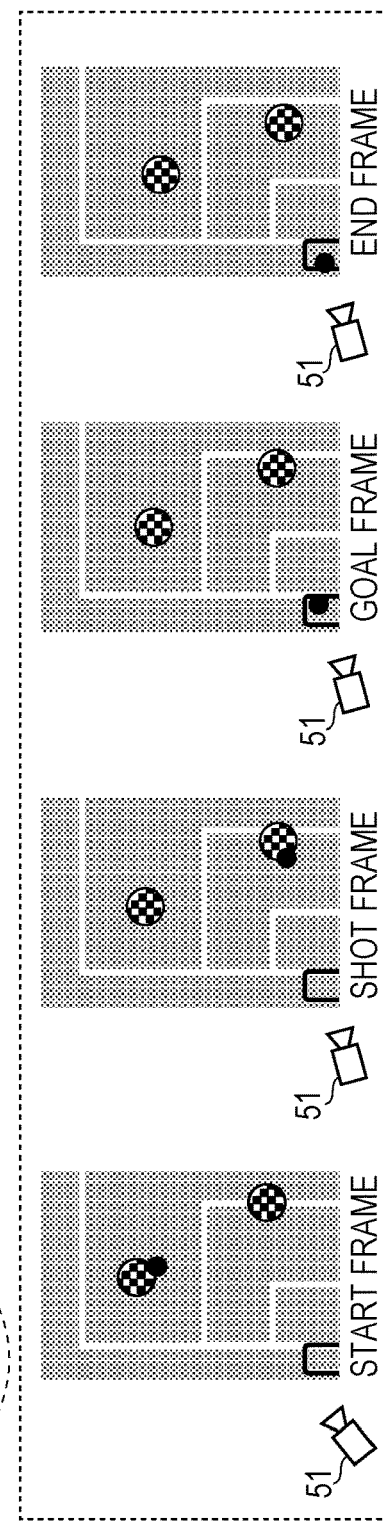

A traveling path 52 of the ball from the start frame to the end frame is as shown in FIG. 10B. A circle 53 that encompasses this traveling path 52 of the ball is as shown in FIG. 10B. Accordingly, the position of the virtual camera that satisfies the virtual camera path conditions for "view movement of entire scene from above" is "8 meters above center of circle encompassing path of movement of ball". Thus, the setting unit 404 sets how to use which subject position information as virtual camera path conditions, so that the calculating unit 303 can decide the position and orientation of the virtual camera using the traveling path of the ball.

Next, an example of virtual camera conditions for the composition scenario "watch goal being scored at point of goal" will be described with reference to the scene illustrated in FIG. 10A. The virtual camera position in the composition scenario "watch goal being scored at point of goal" is "3 meters behind goal point", the orientation of the virtual camera is "ball" before the shot and "point of shot" after the shot. The position of the virtual camera 51 is a position where a straight line from the ball position in the shot frame to the ball position in the goal frame has been extended by three meters, as illustrated in FIG. 10C. The orientation of the virtual camera 51 is set so that the ball is at the middle of the screen from the start frame to the shot frame, and fixed at the shot position from the shot frame to the end frame, as illustrated in FIG. 10C. Thus, the setting unit 404 uses position information of the subject so that the calculating unit 303 can decide the virtual camera position, and set conditions regarding which position of which frame to locate the virtual camera, and how to orient the virtual camera. Note that these specific numbers and specific positions are only exemplary, and that the virtual camera position for the composition scenario "watch goal being scored at point of goal" may be other positions.

Next, an example of virtual camera conditions for the composition scenario "carefully watch instant of foul" regarding a foul scene will be described. The position of the virtual camera in the composition scenario "carefully watch instant of foul" is the position of the assistant referee from the start to the occurrence of the foul. The orientation of the virtual camera is set to where the player that is the subject of the foul is in the image from the start until the foul occurs. In a case where a foul occurs, the position of the virtual camera is rotated around the player regarding which the foul has occurred 360 degrees in the clockwise direction, at the timing at which the foul occurred (staying at the time at which the foul occurred). That is to say, the timing at which the foul occurred can be taken from various angles in the virtual viewpoint image. When the virtual camera returns to the position of the assistant referee, the virtual camera is fixed and elapsing of time is resumed. Thus, the setting unit 404 sets conditions regarding at what time to stop the virtual camera, and from which subject position to rotate the camera, in which orientation, around which subject, so as to be able to decide the timing for stopping elapsing of time in the virtual viewpoint image and the rotating state of the virtual camera. Note that these specific numbers and specific positions are only exemplary, and that the virtual camera position for the composition scenario "carefully watch instant of foul" may be other positions. Also, a composition scenario may be provided where the virtual camera rotates in the same way, around a player kicking a shot, and the time of shooting.

The setting unit 404 also sets, as virtual camera path conditions, how to use the position information of which subject in which frame, regarding composition scenarios other than those described above which are illustrated in FIG. 9. Although an example has been described where the user terminal 400 sets virtual camera path conditions, a configuration may be made where the image processing device 300 calculates the virtual camera path, without the user terminal 400 setting virtual camera path conditions. In this case, the user terminal 400 may transmit to the image processing device 300 the selected scene, composition scenario, and information for identifying a person. The image processing device 300 may be arranged to set the virtual camera path based on the received selected scene, composition scenario, and information for identifying a person.

Returning to the description of FIG. 3, the user terminal 400 transmits a virtual viewpoint image creation request, including the selected scene, composition scenario, information for identifying a person, and information indicating virtual camera conditions, to the image processing device 300 (S4012). Upon receiving the virtual viewpoint image creation request from the user terminal 400, the image processing device 300 creates a virtual viewpoint image based on the received information (S3005).

Figure 11:
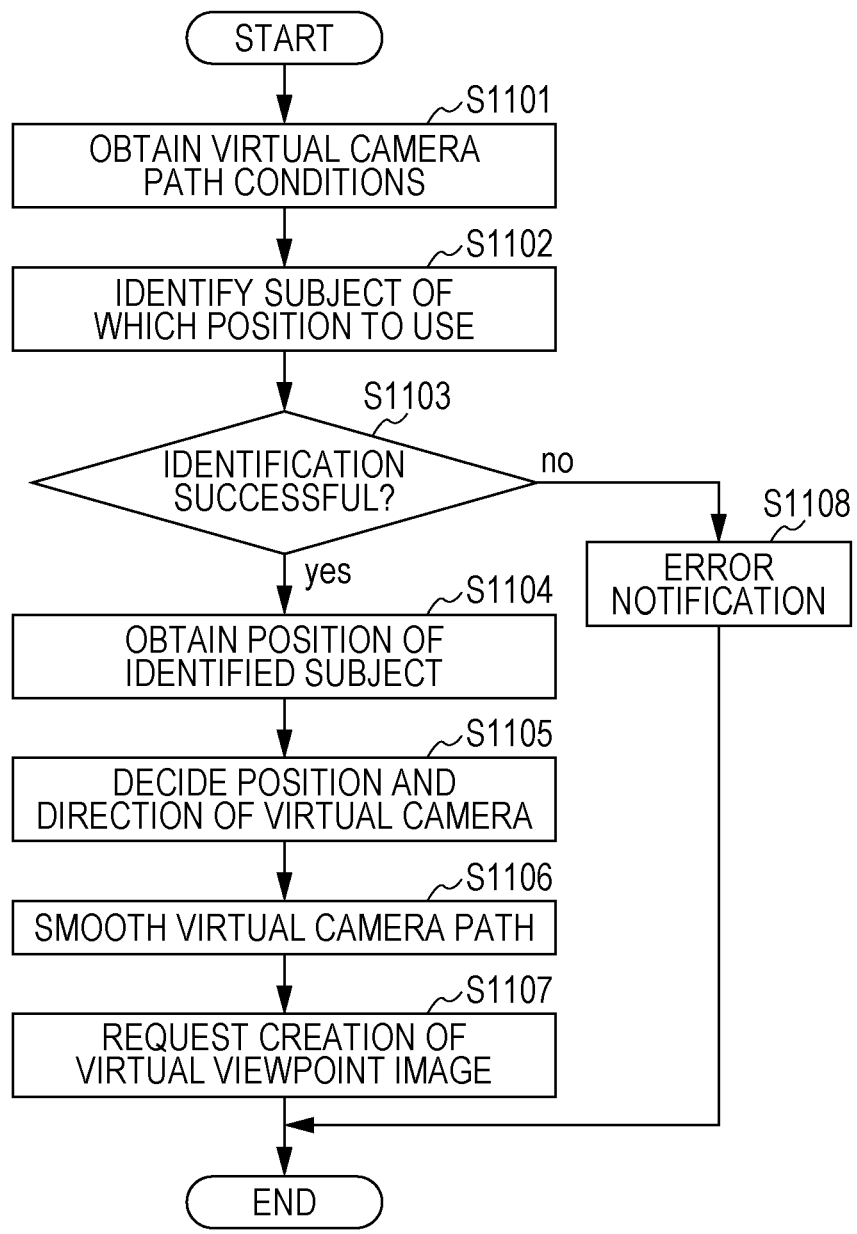
FIG. 11 is a flowchart illustrating the flow of virtual camera path calculation processing.

Now, the virtual camera path calculation processing of the image processing device 300 will be described with reference to FIG. 11. FIG. 11 is a flowchart illustrating the flow of virtual camera path calculation processing performed by the calculating unit 303 of the image processing device 300. The calculating unit 303 of the image processing device 300 starts the virtual camera path calculation processing by receiving the virtual camera path conditions included in the virtual viewpoint image creation request from the user terminal 400. The calculating unit 303 obtains the virtual camera path conditions (S1101). The calculating unit 303 identifies the subject regarding setting the virtual camera path indicated by the virtual camera path conditions (S1102). For example, out of the examples illustrated in FIG. 9, in a case where the virtual camera path conditions are that the position of the virtual camera is "8 meters above center of circle encompassing path of movement of ball", and the orientation of the virtual camera is "straight down", the calculating unit 303 identifies the ball to be the subject regarding which the position will be used from start to end. Also, out of the examples illustrated in FIG. 9, a case where the virtual camera path conditions are that the position of the virtual camera is "3 meters behind goal point" will be considered. In this case, if the orientation of the virtual camera is "ball/kick point", the calculating unit 303 identifies the ball from the start to a player shooting the ball, and the ball in the goal frame, to be the subject regarding which the position is used. Also, in this case, the player kicking the shot may be identified to be the subject regarding which the position is used.

The calculating unit 303 may identify time information used at the time of setting the virtual camera path, such as the time of a shot or the time of a goal being scored, from event log information in the event information storing unit 20, or may identify the time from the positional relation between the player who has scored a goal, the goal line, and the ball. Also, time information used at the time of setting the virtual camera path, such as the time of a shot or the time of a goal being scored, may be identified based on scene determination by image processing of shot images. For example, the time of a shot may be determined based on the ball leaving the scoring player by image processing, and the time may be obtained from the time at which that image was shot. A configuration may be made where the last frame in which the positional difference between the scoring player and the ball is a predetermined value or smaller is found and identified from the frames of the shot image, for the image processing where the ball is determined to have left the player. Also for example, the time at which a goal is scored is identified by determining the first frame at which the ball is situated on the inner side of the goal line, and the time is identified from the time at which that frame was shot.

Thus, the calculating unit 303 identifies which subject and at which shooting time to use for the position, based on the virtual camera path conditions. lithe calculating unit 303 cannot identify a subject to use for the position due to, for example, the shot point being outside of the range regarding which a virtual viewpoint image can be generated (No in S1103), an error is notified to the user terminal 400 (S1108), and the virtual camera path calculation processing is ended. If the calculating unit 303 can identify a subject to use for the position (Yes in S1103), the position information of the subject at a particular time is obtained from the position information obtaining unit 302 (S1104). The calculating unit 303 decides the position and orientation of the virtual camera for each frame in the virtual viewpoint image to be generated, based on the position information of the subject that has been obtained, and the virtual camera path conditions (S1105). In a case where the composition scenario is "view movement of entire scene from above" out of the examples illustrated in FIG. 9, the virtual camera path will be one facing straight down from 8 meters above the center of the circle 53 illustrated in the example in FIG. 10B for all frames from the start of the scene to the end. In a case where the composition scenario is "watch goal being scored at point of goal" out of the examples illustrated in FIG. 9, the virtual camera path will be one where the position of the virtual camera 51 is as illustrated in FIG. 10C, panning from the left to the right following the ball, with the panning stopping at the position where the player kicks a shot. Thus, the calculating unit 303 decides virtual camera parameters for all frames to create a virtual camera path from the start to the end of the scene, so as to satisfy virtual camera path conditions, thereby automatically calculating a virtual camera path. The virtual camera parameters decided here are, for example, the position and/or line-of-sight direction for each frame in the generated virtual viewpoint image. Note that in a case where the movement of the virtual camera that has been calculated exceeds a predetermined threshold value, reproduction speed may be set by the calculating unit 303 as a virtual camera parameter, such as setting the reproduction speed to half speed, so that the viewer can view the virtual viewpoint image better.

Next, a line connecting the positions of the virtual camera in each of the frames identified by the calculated virtual camera path is smoothed, and the coordinates on the smoothed line are identified as positions of the virtual camera by the calculating unit 303 (S1106). Smoothing of the virtual camera path is to suppress the virtual camera from shaking and giving the impression of the virtual viewpoint image having been shot from a camera with a shaking hand, thereby preventing the viewer from experiencing visually induced motion sickness. Note that the processing of S1106 may be omitted. Next, the calculating unit 303 requests the generating unit 301 to generate a virtual viewpoint image in accordance with the calculated virtual camera path (S1107).

Returning to the description in FIG. 3, the generating unit 301 of the image processing device 300 generates a virtual viewpoint image satisfying the virtual camera parameters of the virtual camera that the calculating unit 303 has calculated. That is to say, the generating unit 301 generates a virtual viewpoint image in accordance with the position and/or line-of-sight direction of the viewpoint relating to the virtual viewpoint image decided in accordance with the composition scenario.

The image processing device 300 outputs the generated virtual viewpoint image to the user terminal 400. The user terminal 400 displays the received virtual viewpoint image on the display unit 401. The user terminal 400 presents the received virtual viewpoint image to the viewer by reproducing at the display unit 401 (S4013).

As described above, according to the present embodiment, in a case of shooting an event and generating a virtual viewpoint image from the results of shooting, the event is divided into multiple scenes, and the user can select a scene for which to generate a virtual viewpoint image out of the multiple scenes. Accordingly, the user can generate a virtual viewpoint image regarding a desired time, location, or incident in an event without having to perform troublesome operations. Also, according to the present embodiment, selecting desired conditions from multiple conditions relating to a selected scene that are for deciding the position of the viewpoint for the virtual viewpoint image enables the virtual viewpoint image to be generated without having to perform troublesome operations. Accordingly, the user can view a virtual viewpoint image along a virtual camera path that is appropriate for a selected scene, according to the preferences of the user, without having to perform troublesome operations. The user also can view a virtual viewpoint image of a selected scene on a virtual camera path without having to perform troublesome operations. The viewer can also be provided with a virtual viewpoint image not restricted to a single subject position or orientation, by setting virtual camera conditions from a selected scene, composition scenario, and person, and automatically calculating a virtual camera path from the start to end of the scene. Thus, according to the present embodiment, even users who are not accustomed to performing setting of viewpoints regarding virtual viewpoint images can easily set the viewpoint for the virtual viewpoint image.

Note that in the above-described embodiment, an arrangement may be made where the number of composition scenarios relating to a selected scene is confirmed, and if the number is one, that composition scenario is automatically selected without presenting the user with a composition scenario selection screen. Also, description has been made in the above-described embodiment regarding an arrangement where the user terminal 400 obtains event log information, distinguishes scenes, and generates a scene selection screen, but this is not restrictive. The image processing device 300 may obtain event log information, and distinguish scenes and generate a scene selection screen.

Figure 12:
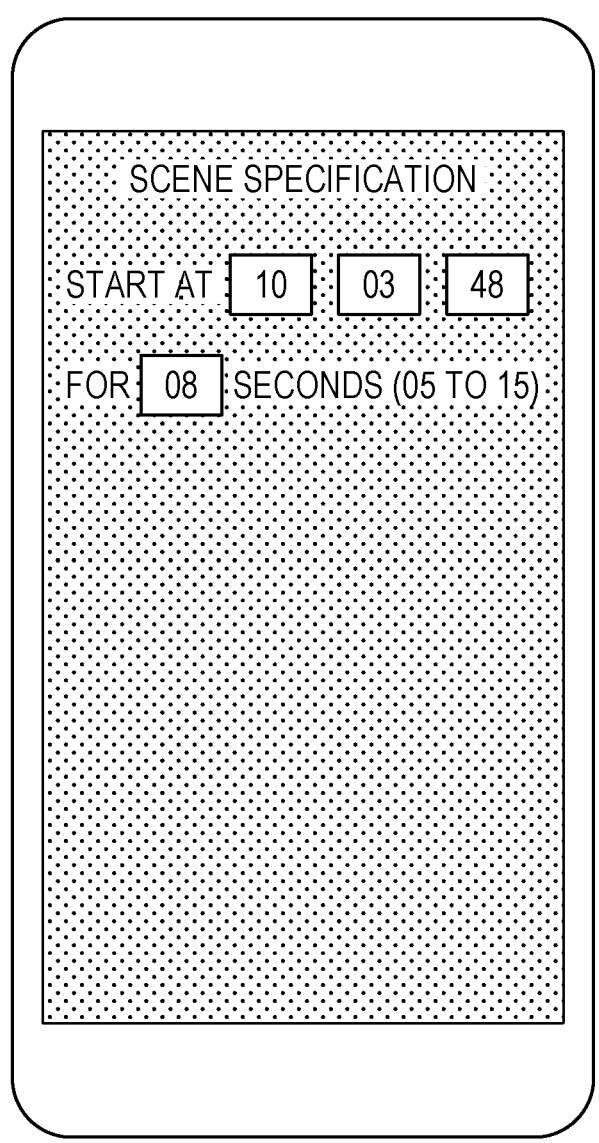
FIG. 12 is a diagram illustrating a scene selection screen example.

An arrangement may also be made where a time or period is specified at the user terminal 400 based on user operations to identify a scene regarding generating of a virtual viewpoint image. FIG. 12 illustrates an example of a screen of accepting user instructions, to identify a scene regarding generating of a virtual viewpoint image by specifying a time or period. The screen in FIG. 12 is for specifying at least the two of a scene start time and the duration to the end of the scene. The screen may be a screen that accepts the scene start time and scene end time. The duration to the end of the scene may be restricted to within a predetermined value, so as to facilitate identification of what sort of a scene has been specified. The image processing device 300 or user terminal 400 may be arranged to identify scenes from event log information. If the specified scene is from 10:03:48 to 10:03:56 eight seconds later as illustrated in FIG. 12, it can be seen that this includes the scoring scene of the shot at 10:03:50, two seconds after the specified scene starts, in the example of the event log information illustrated in FIG. 2C.

Modification

A modification of the above-described embodiment will be described with reference to a flowchart illustrating the flow of operations of the image processing device 300, illustrated in FIG. 14. Note that the configurations of the devices in the modification are the same as in the embodiment described above.

In S1901, the image processing device 300 presents the user with multiple scenes that are candidates for generating a virtual viewpoint image. Note that the image processing device 300 generates the above-described scene selection screen based on event information, and transmits the scene selection screen to the user terminal 400.

In S1902, the image processing device 300 determines whether or not a scene for generating a virtual viewpoint image has been identified by a user having specified a scene by user operations based on information received from the user terminal 400. In a case of having received information identifying a scene from the user terminal 400, the image processing device 300 determines that a scene for generating a virtual viewpoint image has been identified.

In a case of having identified a scene for generating a virtual viewpoint image, in S1903 the image processing device 300 identifies the location, time, and incident of the identified scene, based on the event information. For example, in a case where the identified scene is a scene of a shot being kicked, the location based on the position of the shot is determined by the image processing device 300 to be the location of the scene, a series of time of play over which the shot was kicked to be the identified time of the scene, and the shot to be the incident of the scene.

In a case of having identified the scene for generating a virtual viewpoint image, in S1904 the image processing device 300 identifies people related to the location, time, and incident identified in S1903. For example, in a case where the identified scene is a scene of a shot being kicked, the player who has kicked the shot, the goalie, and a defending player closest to the offense player who has kicked the shot, are identified by the image processing device 300 as being people related to the scene.

In S1905, the image processing device 300 obtains a composition scenario related to at least one of the location, time, and incident of the identified scene, and a composition scenario relating to a subject identified in S1903. In a case where the identified scene is a scene of a shot being kicked, the image processing device 300 obtains, for example, "watch goal being scored at point of goal" illustrated in FIG. 9, as a composition scenario related to at least one of the location, time, and incident of the identified scene. The image processing device 300 also obtains "watch from viewpoint of the player who has kicked the shot, the goalie, or the defending player closest to the offense player who has kicked the shot" as a composition scenario related to the subject identified in S1903. The image processing device 300 creates a composition scenario selection screen for selecting a composition scenario from the obtained composition scenarios, and transmits to the user terminal 400 to be presented to the user.

The image processing device 300 determines in S1906 whether or not a composition scenario relating to the virtual viewpoint image to be generated has been identified by the user having specified a composition scenario by user operations, based on information received from the user terminal 400. In a case of having received information identifying a composition scenario from the user terminal 400, the image processing device 300 determines that the composition scenario has been identified.

In a case of having identified a composition scenario related to the virtual viewpoint image to be generated, in S1907 the image processing device 300 identifies virtual camera parameters based on the identified composition scenario. For example, in a case where "watch from viewpoint of the player who has kicked the shot" is identified as the composition scenario related to the virtual viewpoint image to be generated, the image processing device 300 obtains position information and orientation of the player who kicked the shot in the scene to be generated, from the position information obtaining unit 302. The image processing device 300 sets the virtual camera parameters where the position information and orientation of the player who kicked the shot in the scene to be generated are the virtual camera path.

In S1908, the image processing device 300 generates a virtual viewpoint image based on the identified virtual camera parameters, and in S1909, the image processing device 300 outputs the generated virtual viewpoint image to the user terminal 400.

Thus, according to the above modification, even users who are not accustomed to performing setting of viewpoints regarding virtual viewpoint images can easily set the viewpoint for the virtual viewpoint image. According to the above embodiment, setting of viewpoints regarding virtual viewpoint images can easily be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. It will of course be understood that this invention has been described above by way of example only, and that modifications of detail can be made within the scope of this invention.

This application claims the benefit of Japanese Patent Application No. 2017-166106 filed Aug. 30, 2017, which is hereby incorporated by reference herein in its entirety.

What is claimed is:

1. An information processing apparatus comprising:
one or more hardware processors; and
one or more memories which store instructions executable by the one or more hardware processors to cause the information processing apparatus to perform at least:
determining a scene regarding which a virtual viewpoint image is to be generated, the scene being included in an event captured by a plurality of imaging apparatuses that obtain captured images for generating the virtual viewpoint image; and
determining, based on the determined scene, a view direction and a position of a virtual viewpoint corresponding to the virtual viewpoint image to be generated.

2. The information processing apparatus according to claim 1, wherein the instructions further cause the information processing apparatus to perform
determining a composition scenario corresponding to the determined scene,
wherein the view direction and the position of the virtual viewpoint is determined based on the determined composition scenario.

3. The information processing apparatus according to claim 2,
wherein the composition scenario is selected based on a user operation from among a plurality of composition scenarios corresponding to the determined scene.

4. The information processing apparatus according to claim 2,
wherein a successive transition of the view direction and the position of the virtual viewpoint is determined based on the determined composition scenario.

5. The information processing apparatus according to claim 1,
wherein the event includes at least one of a goal scene, a shot scene, and a foul scene.

6. The information processing apparatus according to claim 1,
wherein the scene is determined based on a user operation.

7. The information processing apparatus according to claim 1,
wherein at least one of a capturing time associated with the virtual viewpoint image to be generated, a location shown in the virtual viewpoint image to be generated, and an incident shown in the virtual viewpoint image to be generated, is determined based on the determined scene.

8. An information processing apparatus comprising:
one or more hardware processors; and
one or more memories which store instructions executable by the one or more hardware processors to cause the information processing apparatus to perform at least:
specifying a condition selected based on a user operation, from among a plurality of conditions for determining a view direction and a position of a virtual viewpoint corresponding to a virtual viewpoint image that is to be generated based on captured images obtained by a plurality of imaging apparatuses; and
determining, based on the specified condition, the view direction and the position of the virtual viewpoint corresponding to the virtual viewpoint image to be generated.

9. The information processing apparatus according to claim 1, wherein the instructions further cause the information processing apparatus to perform generating the virtual viewpoint image in accordance with the determined view direction and the determined position of the virtual viewpoint.

10. The information processing apparatus according to claim 9, wherein the instructions further cause the information processing apparatus to perform outputting the generated virtual viewpoint image.

11. The information processing apparatus according to claim 1, wherein the instructions further cause the information processing apparatus to perform determining a condition selected based on a user operation from among a plurality of conditions for determining the view direction and the position of the virtual viewpoint,
wherein the view direction and the position of the virtual viewpoint is determined based on the determined condition.

12. The information processing apparatus according to claim 1, wherein the instructions further cause the information processing apparatus to perform obtaining position information of a particular subject in the captured images,
wherein the view direction and the position of the virtual viewpoint is determined based on the obtained position information of the particular subject.

13. The information processing apparatus according to claim 3,
wherein the plurality of composition scenarios includes a composition scenario for taking a line-of-sight of a person as the view direction.

14. The information processing apparatus according to claim 3,
wherein the plurality of composition scenarios includes a composition scenario for rotating the virtual viewpoint centered on a predetermined position.

15. The information processing apparatus according to claim 14,
wherein the predetermined position is the position of a predetermined person.

16. A method comprising:
determining a scene regarding which a virtual viewpoint image is to be generated, the scene being included in an event captured by a plurality of imaging apparatuses that obtain captured images for generating the virtual viewpoint image; and
determining, based on the determined scene, a view direction and a position of a virtual viewpoint corresponding to the virtual viewpoint image to be generated.

17. A method comprising:
specifying a condition selected based on a user operation, from among a plurality of conditions for determining a view direction and a position of a virtual viewpoint corresponding to a virtual viewpoint image that is to be generated based on captured images obtained by a plurality of imaging apparatus; and
determining, based on the specified condition, the view direction and the position of the virtual viewpoint corresponding to the virtual viewpoint image to be generated.

18. A non-transitory computer-readable storage medium storing a program comprising instructions which, when the program is executed by a computer, cause the computer to carry out a method, the method comprising:
determining a scene regarding which a virtual viewpoint image is to be generated, the scene being included in an event captured by a plurality of imaging apparatuses that obtain captured images for generating the virtual viewpoint; and
determining, based on the determined scene, a view direction and a position of a virtual viewpoint corresponding to the virtual viewpoint image to be generated.

19. A non-transitory computer-readable storage medium storing a program comprising instructions which, when the program is executed by a computer, cause the computer to carry out a method, the method comprising:
specifying a condition selected based on a user operation, from among a plurality of conditions for determining a view direction and a position of a virtual viewpoint corresponding to a virtual viewpoint image that is to be generated based on captured images obtained by a plurality of imaging apparatuses; and
determining, based on the specified condition, the view direction and the position of the virtual viewpoint corresponding to the virtual viewpoint image to be generated.

* * * * *